United States Patent
Park et al.

(10) Patent No.: US 9,858,709 B2
(45) Date of Patent: Jan. 2, 2018

(54) APPARATUS AND METHOD FOR PROCESSING PRIMITIVE IN THREE-DIMENSIONAL (3D) GRAPHICS RENDERING SYSTEM

(71) Applicant: SAMSUNG ELECTRONICS CO., LTD., Suwon-si, Gyeonggi-do (KR)

(72) Inventors: Jeong Soo Park, Gwacheon-si (KR); Sang Oak Woo, Anyang-si (KR); Seok Yoon Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 545 days.

(21) Appl. No.: 14/087,719

(22) Filed: Nov. 22, 2013

(65) Prior Publication Data

US 2014/0146042 A1    May 29, 2014

(30) Foreign Application Priority Data

Nov. 29, 2012   (KR) .................. 10-2012-0137101
Apr. 2, 2013    (KR) .................. 10-2013-0035929

(51) Int. Cl.
| | | |
|---|---|---|
| *G06T 15/10* | (2011.01) | |
| *G06T 15/40* | (2011.01) | |
| *G06T 19/00* | (2011.01) | |
| *G06T 17/20* | (2006.01) | |
| *G06T 15/30* | (2011.01) | |
| *G06T 17/00* | (2006.01) | |
| *G06T 15/00* | (2011.01) | |

(52) U.S. Cl.
CPC .............. *G06T 15/40* (2013.01); *G06T 17/20* (2013.01); *G06T 19/00* (2013.01); *G06T 15/005* (2013.01); *G06T 15/30* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 6,246,415 B1 | 6/2001 | Grossman et al. | |
| 6,424,345 B1* | 7/2002 | Smith | G06T 11/40 345/423 |
| 6,611,263 B1 | 8/2003 | Huang et al. | |
| 7,292,239 B1 | 11/2007 | Moreton et al. | |
| 7,307,628 B1 | 12/2007 | Goodman et al. | |
| 7,400,325 B1* | 7/2008 | Gimby | G06T 15/40 345/418 |
| 7,414,636 B2 | 8/2008 | Kokojima et al. | |
| 7,468,726 B1 | 12/2008 | Wloka et al. | |
| 7,791,605 B2 | 9/2010 | Jiao et al. | |
| 7,834,872 B2 | 11/2010 | Fenney et al. | |
| 8,217,962 B2 | 7/2012 | Tong et al. | |
| 2007/0097141 A1 | 5/2007 | Barenbrug et al. | |

(Continued)

FOREIGN PATENT DOCUMENTS

JP       2003-228733       8/2003

*Primary Examiner* — Saptarshi Mazumder
(74) *Attorney, Agent, or Firm* — Sughrue Mion, PLLC

(57) ABSTRACT

An apparatus and method for processing a primitive in a three-dimensional (3D) graphics rendering system is provided. The primitive processing apparatus may discard a primitive or store the primitive in a memory, depending on whether a sampling point overlapping the primitive is present among sampling points in a pixel area.

6 Claims, 11 Drawing Sheets

(56) References Cited

U.S. PATENT DOCUMENTS

2009/0167759 A1\* 7/2009 Ushida ................... G06T 17/05
　　　　　　　　　　　　　　　　　　　　　　　　345/420
2013/0194448 A1\* 8/2013 Baheti ................ G06K 9/00456
　　　　　　　　　　　　　　　　　　　　　　　　348/222.1

\* cited by examiner

400

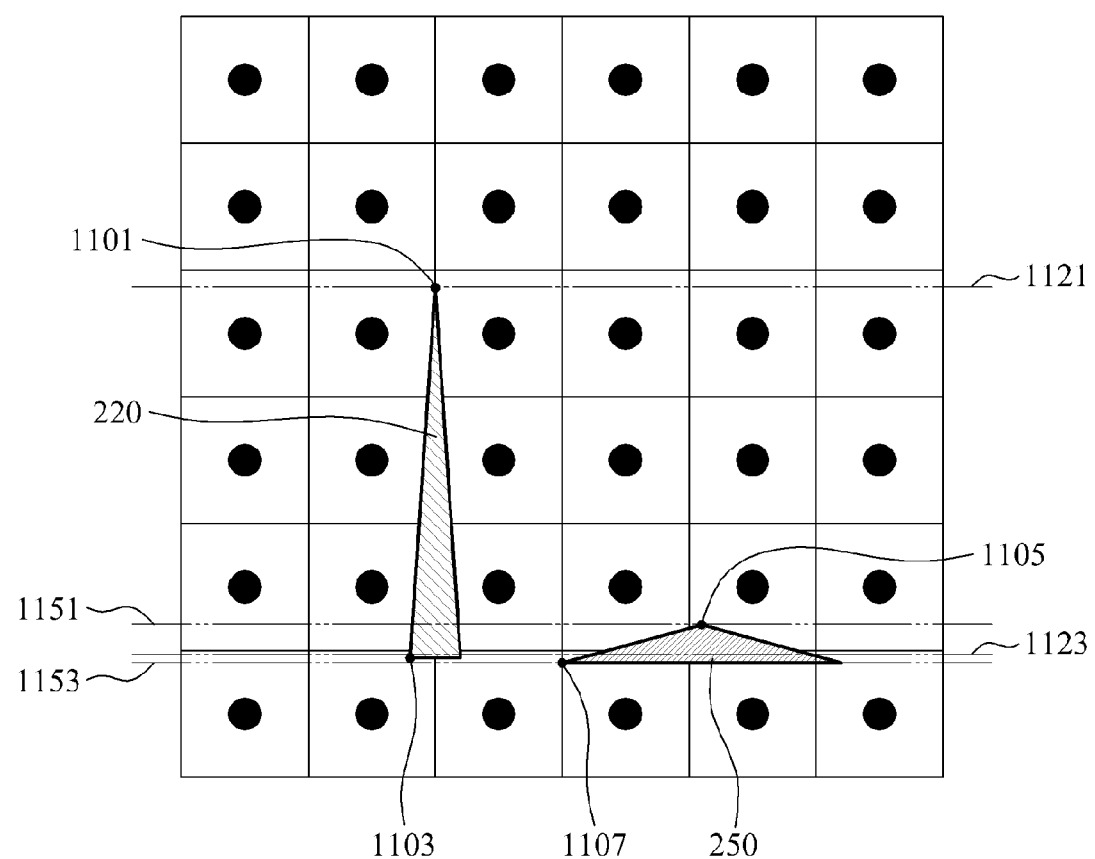

APPARATUS AND METHOD FOR PROCESSING PRIMITIVE IN THREE-DIMENSIONAL (3D) GRAPHICS RENDERING SYSTEM

CROSS-REFERENCE TO RELATED APPLICATIONS

This application claims the priority benefit of Korean Patent Application No. 10-2012-0137101, filed on Nov. 29, 2012 in the Korean Intellectual Property Office, and Korean Patent Application No. 10-2013-0035929, filed on Apr. 2, 2013 in the Korean Intellectual Property Office, the disclosures of which are incorporated herein by reference.

BACKGROUND

1. Field

Embodiments relate to an apparatus and method for processing a primitive in a three-dimensional (3D) graphics rendering system.

2. Description of the Related Art

A polygon-based three-dimensional (3D) graphics system may model an object of a real world using a geometric primitive. In this instance, a space in which the object is disposed may be projected on a two-dimensional (2D) screen, and a 2D image may be generated through a process of rendering an image on which the object is projected.

A polygon may express a surface of an object using a plurality of vertices and edges connecting the plurality of vertices.

By processing a primitive efficiently, an overall processing efficiency of a 3D graphics rendering system may increase.

SUMMARY

In an aspect of one or more embodiments, there is provided a method of processing a primitive in a three-dimensional (3D) graphics rendering system, the method including disposing a primitive in a pixel area, determining whether a sampling point overlapping the primitive is present among sampling points in the pixel area, and discarding the primitive, when a sampling point overlapping the primitive is absent.

The determining may include calculating a bounding slab with respect to the primitive, using a maximum value and a minimum value among vertices of the primitive, and determining whether the bounding slab overlaps at least one of the sampling points in the pixel area.

The bounding slab may include a bounding slab of a first axial direction, and a bounding slab of a second axial direction.

The foregoing and/or other aspects are achieved by providing a method of processing a primitive in a 3D graphics rendering system, the method including disposing a primitive in a pixel area, and calculating a bounding slab with respect to the primitive, using vertex information of the primitive, and processing the primitive based on the bounding slab.

The processing may include calculating a first slab passing through a maximum value of a first axial direction among vertices of the primitive, calculating a second slab passing through a minimum value of the first axial direction among the vertices of the primitive, determining whether a sampling point is present between the first slab and the second slab, and discarding the primitive, when a sampling point is absent between the first slab and the second slab.

The processing may further include calculating a bounding slab of a second axial direction, when a sampling point is present between the first slab and the second slab.

The calculating of the bounding slab may include calculating a third slab passing through a maximum value of the second axial direction among the vertices of the primitive, and calculating a fourth slab passing through a minimum value of the second axial direction among the vertices of the primitive.

The processing may further include determining whether a sampling point is present between the third slab and the fourth slab, and discarding the primitive, when a sampling point is absent between the third slab and the fourth slab.

The processing may further include storing information on the primitive in a memory, when a sampling point is present between the third slab and the fourth slab.

In an aspect of one or more embodiments, there is provided an apparatus for processing a primitive in a 3D graphics rendering system, the apparatus including a primitive disposer to dispose a primitive in a pixel area, a determiner to determine whether a sampling point overlapping the primitive is present among sampling points in the pixel area, and a primitive processor to discard the primitive, when the primitive does not overlap at least one of the sampling points in the pixel area.

The determiner may include a bounding slab calculator to calculate a bounding slab with respect to the primitive, using a maximum value and a minimum value among vertices of the primitive, and a primitive determiner to determine whether the bounding slab overlaps at least one of the sampling points in the pixel area.

In an aspect of one or more embodiments, there is provided an apparatus for processing a primitive in a 3D graphics rendering system, the apparatus including a primitive disposer to dispose a primitive in a pixel area, and a primitive processor to calculate a bounding slab with respect to the primitive, using vertex information of the primitive, and process the primitive based on the bounding slab.

The primitive processor may calculate a first slab passing through a maximum value of a first axial direction among vertices of the primitive, calculate a second slab passing through a minimum value of the first axial direction among the vertices of the primitive, determine whether a sampling point is present between the first slab and the second slab, and discard the primitive, when a sampling point is absent between the first slab and the second slab.

When a sampling point is present between the first slab and the second slab, the primitive processor may calculate a bounding slab of a second axial direction, by calculating a third slab passing through a maximum value of the second axial direction among the vertices of the primitive, and calculating a fourth slab passing through a minimum value of the second axial direction among the vertices of the primitive.

The primitive processor may determine whether a sampling point is present between the third slab and the fourth slab. When it is determined that a sampling point is absent between the third slab and the fourth slab, the primitive processor may discard the primitive. When it is determined that a sampling point is present between the third slab and the fourth slab, the primitive processor may store information on the primitive in a memory.

In an aspect of one or more embodiments, there is provided a method of processing a primitive in a three-dimensional (3D) graphics rendering system to display an image, the method including disposing a primitive in a pixel area, determining whether a sampling point overlapping the primitive is present among sampling points in the pixel area, discarding the primitive, when a sampling point overlapping the primitive is absent, storing information on the primitive in a memory when at least one sampling point overlapping the primitive is present, generating the image based on stored information, and displaying the generated image on a display.

In an aspect of one or more embodiments, there is provided an apparatus for processing a primitive in a three-dimensional (3D) graphics rendering system to display an image, the apparatus including a memory, a primitive disposer to dispose a primitive in a pixel area, a determiner to determine whether a sampling point overlapping the primitive is present among sampling points in the pixel area, a primitive processor to discard the primitive, when a sampling point overlapping the primitive is absent among the sampling points, and to store information on the primitive in the memory when at least one sampling point overlapping the primitive is present, a generator to generate the image, and a display to display the generated image.

According to an aspect of one or more embodiments, there is provided at least one non-transitory computer readable medium storing computer readable instructions to implement methods of one or more embodiments.

BRIEF DESCRIPTION OF THE DRAWINGS

These and/or other aspects will become apparent and more readily appreciated from the following description of embodiments, taken in conjunction with the accompanying drawings of which:

FIGS. 10 and 11 illustrate applications of a bounding slab according to example embodiments.

DETAILED DESCRIPTION

Figure 1:
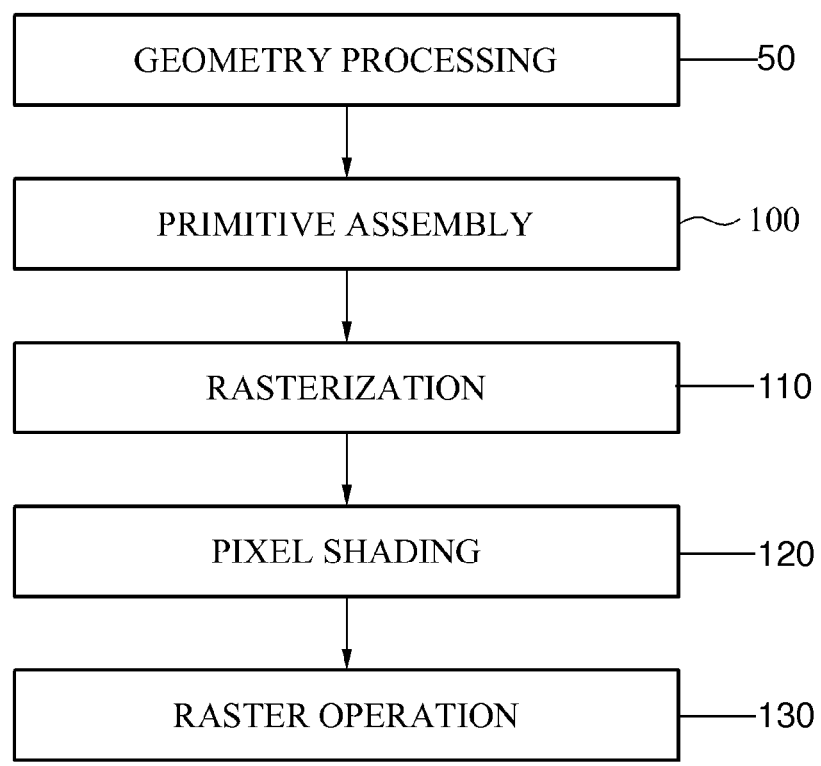
FIG. 1 illustrates operations of a polygon-based three-dimensional (3D) graphics system according to a related art.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates operations of a polygon-based three-dimensional (3D) graphics system according to a related art.

The 3D graphics system may perform operations of FIG. 1 for image processing to generate a two-dimensional (2D) image of an object present in a 3D space.

The 3D graphics system may perform geometry processing, primitive assembly 100, rasterization, pixel shading, and a raster operation.

The operations of FIG. 1 may be performed by a graphic processor.

The geometry processing 50 refers to a process of projecting, in a 2D space, vertices of a primitive disposed in a 3D space.

Through the primitive assembly 100, the projected vertices may be configured to be a primitive of a point, a line, and a plane. The following example embodiments may apply to the primitive assembly 100.

The primitive assembly 100 refers to a process of generating a unit figure using data related to the projected vertices. In this instance, the unit figure refers to a primitive represented by a figure on a 2D plane.

During the primitive assembly 100, the graphic processor may perform a process of culling or clipping the unit figure. In addition, the graphic processor may perform viewpoint mapping of converting the unit figure on which the process of culling or clipping is performed into coordinates in a 2D space. Information about the unit figure on which the viewpoint mapping is performed may be stored in a memory, and the information stored in the memory may be used for the rasterization.

The rasterization 110 refers to a process of generating pixel data for filling an internal portion of the unit figure, and generating a pixel pattern image.

The pixel shading 120 refers to a process of calculating respective colors of pixels, using the pixel data generated through the rasterization.

The raster operation 130 refers to a process of performing a visibility test for a pixel and frame buffer writing.

Figure 2:
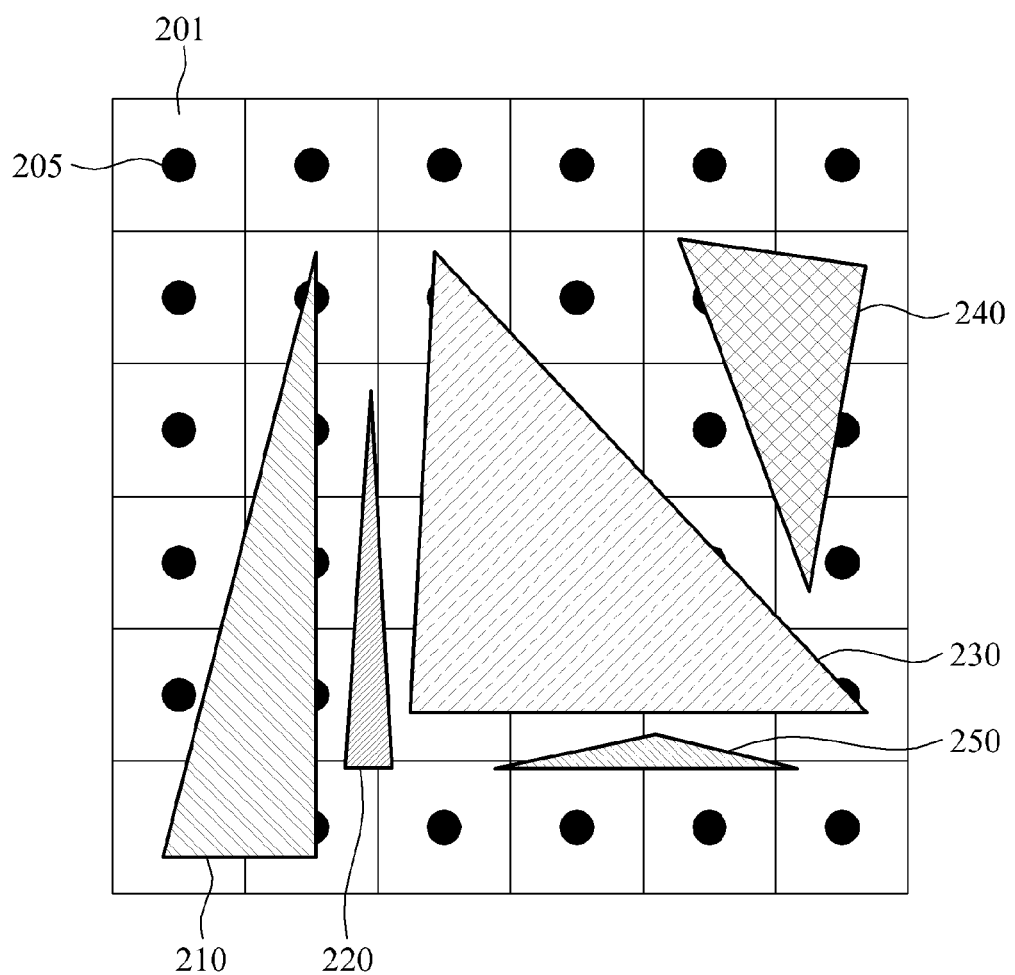
FIG. 2 illustrates an image in which primitives are disposed in a pixel area according to example embodiments.

FIG. 2 illustrates an image in which primitives are disposed in a pixel area according to example embodiments.

In FIG. 2, a plurality of primitives 210, 220, 230, 240, and 250 disposed in a pixel area after viewpoint mapping is performed are illustrated.

Referring to FIG. 2, the pixel area may be represented as a 2D space including a plurality of pixels. In the example of FIG. 2, the pixel area may include 6×6 pixels.

The plurality of primitives 210, 220, 230, 240, and 250 may be represented by unit figures provided in a triangular shape. The unit figures may be provided in different colors, and the different colors may be represented by different hatching patterns in FIG. 2.

In a pixel area, a sampling point in the pixel area may be defined as a center of each pixel. For example, a central point 205 of a first pixel 201 may be used as a sampling point.

In the example of FIG. 2, the primitive 220, and the primitive 250 do not overlap sampling points present in the pixel area.

In contrast, the primitive 210, the primitive 230, and the primitive 240 overlap a plurality of sampling points.

Figure 3:
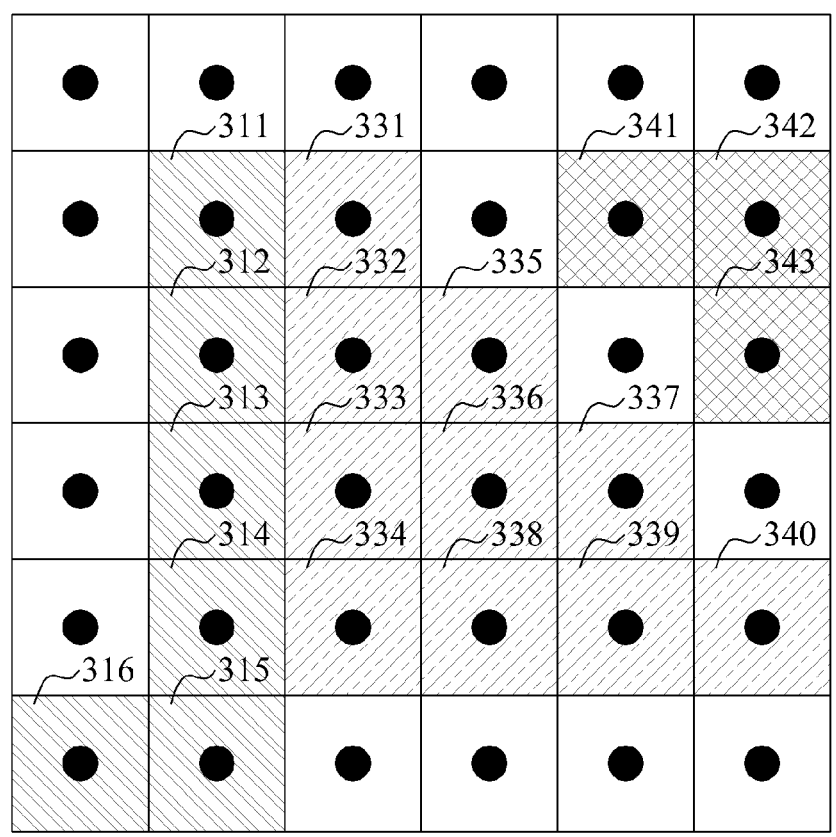
FIG. 3 illustrates an image in which pixels are represented using colors of the primitives of FIG. 2.

A result of performing viewpoint mapping on the primitives disposed as shown in FIG. 2 may be illustrated in FIG. 3.

FIG. 3 illustrates an image in which pixels are represented using colors of the primitives of FIG. 2.

Referring to FIGS. 2 and 3, sampling points of pixels 311, 312, 313, 314, 315, and 316 may overlap the primitive 210. Accordingly, a color value of the pixels 311, 312, 313, 314, 315, and 316 may be determined to be a color value identical to a color value of the primitive 210, through rasterization.

A color value of pixels 331, 332, 333, 334, 335, 336, 337, 338, 339, and 340 may be determined to be a color value identical to a color value of the primitive 230.

A color value of pixels 341, 342, and 343 may be determined to be a color value identical to a color value of the primitive 240.

In this instance, since the primitive 220 and the primitive 250 do not overlap sampling points, the primitive 220 and the primitive 250 may not be influential in determining a color value of a pixel.

Accordingly, although the viewpoint mapping is performed, a unit figure not contributing to determination of a color value of a pixel may be present. Accordingly, when such a unit figure not contributing to determination of a color value of a pixel is stored in a memory, unnecessary consumption of a memory space and a writing bandwidth may occur.

The following example embodiments may include a process of filtering a unit figure not contributing to determination of a color value of a pixel, using coordinates information of vertices, and the like, after viewpoint mapping is performed.

Accordingly, a size of a space for storing primitives may be reduced, and a writing bandwidth occurring when the primitives are stored may be reduced.

In addition, a writing bandwidth for retrieving the primitives stored in a memory during rasterization may be reduced.

Further, when a unit figure not contributing to determination of a color value of a pixel is culled, a number of primitives to be processed during the rasterization may be reduced. Accordingly, a workload of the rasterization may be reduced.

Figure 4:
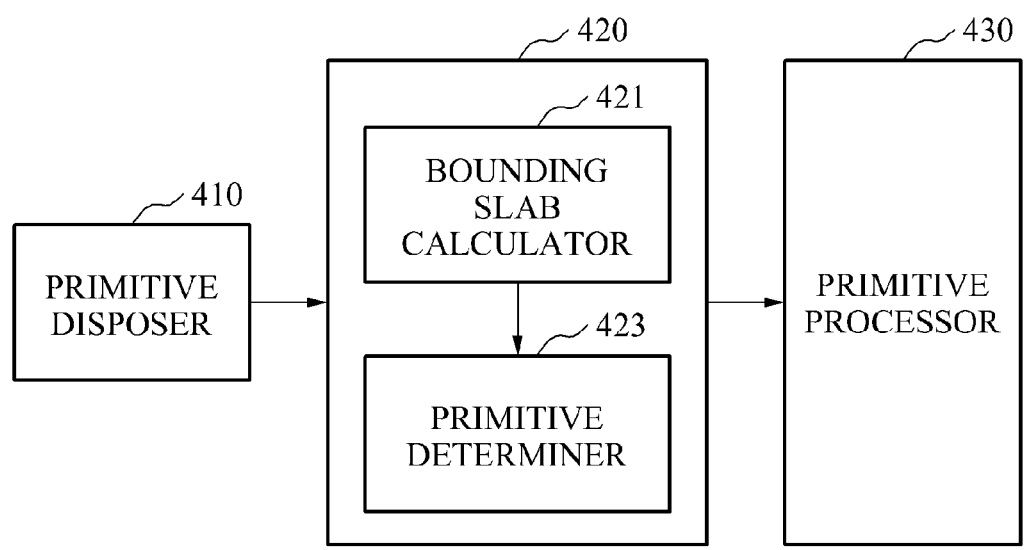
FIG. 4 illustrates a configuration of a primitive processing apparatus according to example embodiments.

FIG. 4 illustrates a configuration of a primitive processing apparatus 400 according to example embodiments.

Referring to FIG. 4, the primitive processing apparatus 400 may include a primitive disposer 410, a determiner 420, and a primitive processor 430.

The primitive disposer 410 may dispose a primitive in a pixel area.

For example, the primitive disposers 410 may dispose the triangular primitives 210, 220, 230, 240, and 250 in the pixel area, as shown in FIG. 2.

The determiner 420 may determine whether a sampling point overlapping the primitive is present among sampling points in the pixel area.

The determiner 420 may include a bounding slab calculator 421, and a primitive determiner 423.

The bounding slab calculator 421 may calculate a bounding slab with respect to the primitive, using a maximum value and a minimum value among vertices of the primitive.

The bounding slab may be used as a criterion for determining whether the primitive overlaps a sampling point. In this example, the bounding slab may include a bounding slab of a first axial direction and a bounding slab of a second axial direction. The first axial direction may correspond to an x-axial direction of the pixel area, and the second axial direction may correspond to a y-axial direction of the pixel area.

The primitive determiner 423 may determine whether the bounding slab overlaps at least one of the sampling points in the pixel area.

The primitive processor 430 may discard the primitive when a sampling point overlapping the primitive is absent among the sampling points.

In this instance, "discarding the primitive" may indicate culling the primitive, without any further processing of the primitive.

In addition, the primitive processor 430 may store information on the primitive in a memory (not shown) when at least one sampling point overlapping the primitive is present among the sampling points.

For example, the primitive processor 430 may cull the primitive 220 and the primitive 250 of FIG. 2.

An operation of the primitive processor 430 and the bounding slab will be described in detail with reference to FIGS. 10 and 11.

Figure 10:
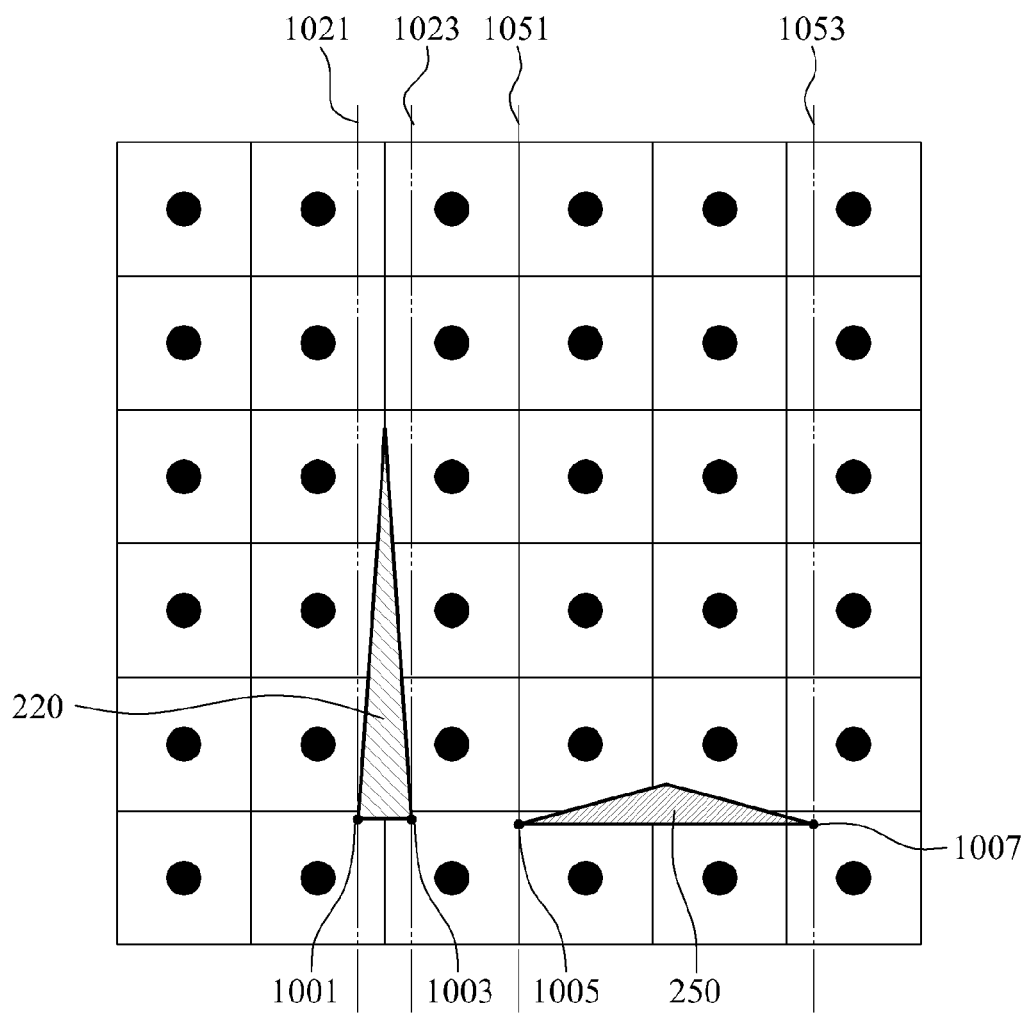

FIGS. 10 and 11 illustrate applications of a bounding slab according to example embodiments.

Referring to FIG. 10, a bounding slab of a first axial direction may include a first slab 1023 passing through a maximum value 1003 of the first axial direction among vertices of a primitive 220, and a second slab 1021 passing through a minimum value 1001 of the first axial direction among the vertices of the primitive 220.

The primitive processor 430 may discard the primitive 220 when a sampling point is absent between the first slab 1023 and the second slab 1021.

The primitive processor 430 may control the bounding slab calculator 421 to calculate a bounding slab of a second axial direction when a sampling point is present between the first slab 1023 and the second slab 1021.

Referring to FIG. 11, the bounding slab of the second axial direction of the primitive 220 may include a third slab 1121 passing through a maximum value 1101 of the second axial direction among the vertices of the primitive 220, and a fourth slab 1123 passing through a minimum value 1103 of the second axial direction among the vertices of the primitive 220.

The primitive processor 430 may discard the primitive 220 when a sampling point is absent between the third slab 1121 and the fourth slab 1123, and store information on the primitive 220 in the memory when a sampling point is present between the third slab 1121 and the fourth slab 1123.

Referring again to FIG. 10, since a sampling point is absent between the first slab 1023 and the second slab 1021, the primitive 220 may be discarded, without calculating the bounding slab of the second axial direction.

Since a bounding slab of the first axial direction of a primitive 250 overlaps sampling points, the primitive 250 may be discarded after a bounding slab of the second axial direction is calculated.

The bounding slab of the first axial direction with respect to the primitive 250 may include a slab 1051 passing through a minimum value 1005 of an x-axial direction, and a slab 1053 passing through a maximum value 1007 of the x-axial direction.

As shown in FIG. 10, twelve sampling points are present between the slab 1051 and the slab 1053.

Accordingly, the bounding slab calculator 421 may calculate a bounding slab of the second axial direction with respect to the primitive 250.

Referring again to FIG. 11, the bounding slab of the second axial direction with respect to the primitive 250 may include a slab 1151 passing through a maximum value 1105 of a y-axial direction, and a slab 1153 passing through a minimum value 1107 of the y-axial direction.

Here, sampling points are absent between the slab 1151 and the slab 1153. Accordingly, the bounding slab of the second axial direction with respect to the primitive 250 may be present between sampling points, and have a size smaller than a space between the sampling points.

Accordingly, the primitive processor 430 may discard the primitive 250 after the bounding slab of the second axial direction is calculated.

Figure 5:
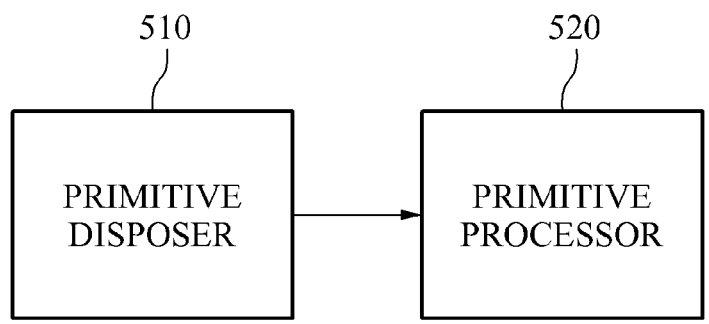
FIG. 5 illustrates a configuration of a primitive processing apparatus according to example embodiments.

FIG. 5 illustrates a configuration of a primitive processing apparatus 500 according to example embodiments.

Referring to FIG. 5, the primitive processing apparatus 500 may include a primitive disposer 510, and a primitive processor 520.

The primitive disposer 510 may dispose a primitive in a pixel area.

For example, the primitive disposer 510 may dispose the triangular primitives 210, 220, 230, 240, and 250 in the pixel area, as shown in FIG. 2.

The primitive processor 520 may calculate a bounding slab with respect to the primitive, using vertex information of the primitive, and process the primitive based on the bounding slab.

In particular, the primitive processor 520 may calculate a first slab passing through a maximum value of a first axial direction among vertices of the primitive.

The primitive processor 520 may calculate a second slab passing through a minimum value of the first axial direction among the vertices of the primitive. The primitive processor 520 may determine whether a sampling point is present between the first slab and the second slab. When it is determined that a sampling point is absent between the first slab and the second slab, the primitive processor 520 may discard the primitive.

In this instance, "discarding the primitive" may indicate culling the primitive, without any further processing of the primitive.

When it is determined that a sampling point is present between the first slab and the second slab, the primitive processor 520 may calculate a third slab passing through a maximum value of a second axial direction among the vertices of the primitive. The primitive processor 520 may calculate a fourth slab passing through a minimum value of the second axial direction among the vertices of the primitive. In so doing, the primitive processor 520 may calculate a bounding slab of the second axial direction.

The primitive processor 520 may determine whether a sampling point is present between the third slab and the fourth slab. When it is determined that a sampling point is absent between the third slab and the fourth slab, the primitive processor 520 may discard the primitive. When it is determined that a sampling point is present between the third slab and the fourth slab, the primitive processor 520 may store information on the primitive in a memory (not shown).

Figure 6:
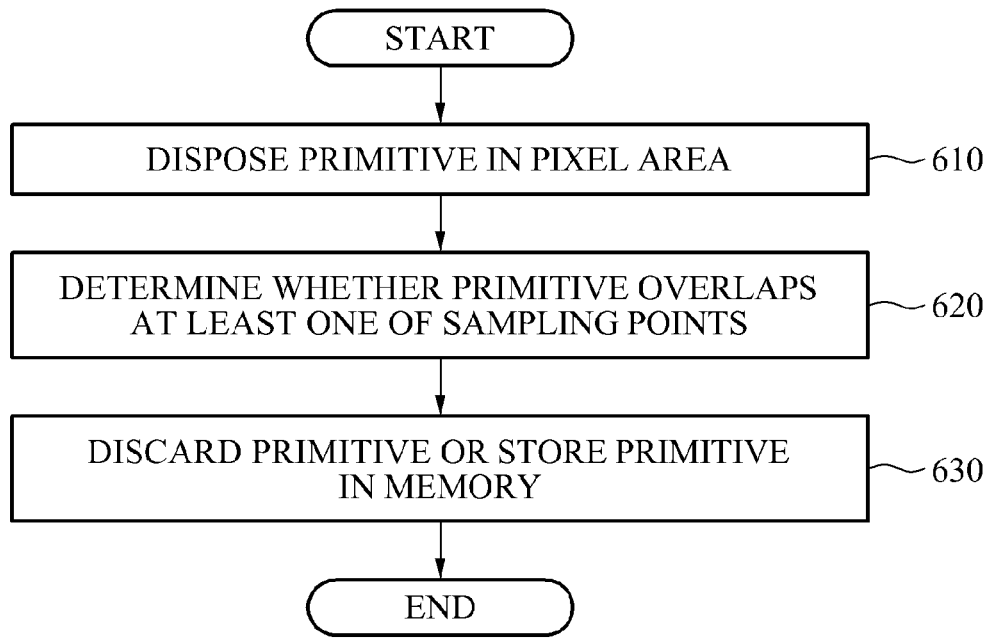
FIG. 6 illustrates a primitive processing method according to example embodiments.

FIG. 6 illustrates a primitive processing method according to example embodiments.

The method of FIG. 6 may be performed by a graphic processor or the primitive processing apparatus 400 of FIG. 4.

In operation 610, a primitive may be disposed in a pixel area.

In operation 620, whether a sampling point overlapping the primitive is present among sampling points in the pixel area may be determined.

In this instance, a bounding slab with respect to the primitive may be calculated using a maximum value and a minimum value among vertices of the primitive, and whether the bounding slab overlaps at least one of the sampling points in the pixel area may be determined.

The bounding slab may include a bounding slab of a first axial direction, and a bounding slab of a second axial direction.

In operation 630, the primitive may be discarded when a sampling point overlapping the primitive is absent, or stored in memory when at least one sampling point overlapping the primitive is present.

For example, the primitive 220 and the primitive 250 of FIG. 2 may be discarded in operation 630.

Figure 7:
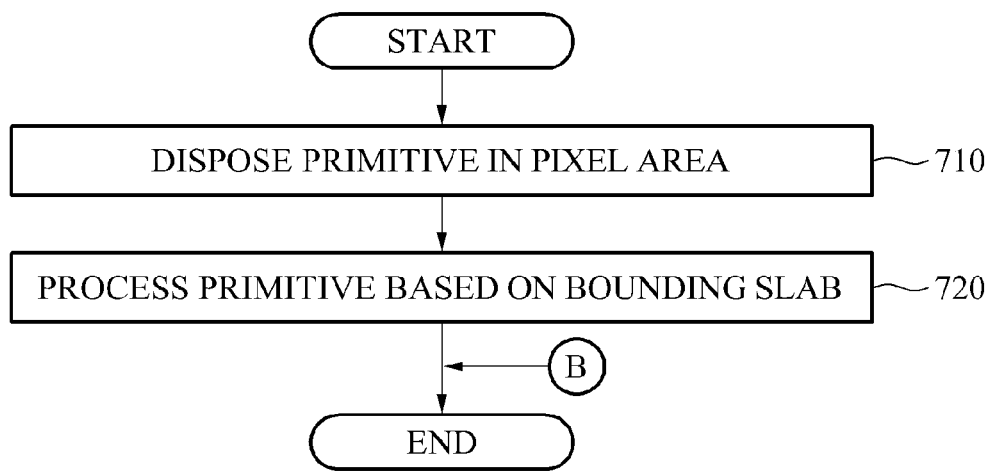
FIG. 7 illustrates a primitive processing method according to example embodiments.

FIG. 7 illustrates a primitive processing method according to example embodiments.

The method of FIG. 7 may be performed by a graphic processor or the primitive processing apparatus 500 of FIG. 5.

In operation 710, a primitive may be disposed in a pixel area.

In operation 720, a bounding slab with respect to the primitive may be calculated using vertex information of the primitive, and the primitive may be processed based on the bounding slab.

A process of processing the primitive based on the bounding slab will be described in detail with reference to FIGS. 8 and 9.

Figure 8:
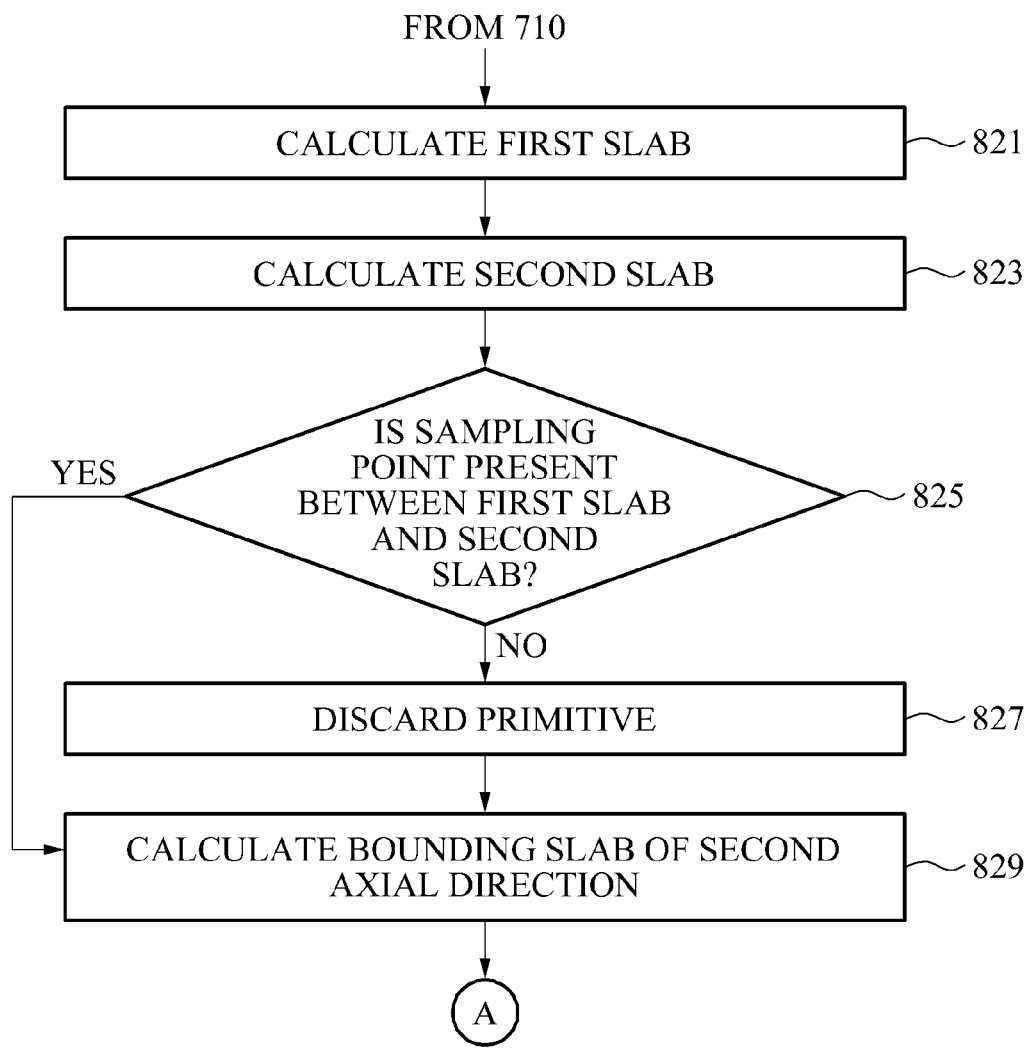
FIGS. 8 and 9 illustrate methods of processing a primitive based on a bounding slab according to example embodiments.
Figure 9:
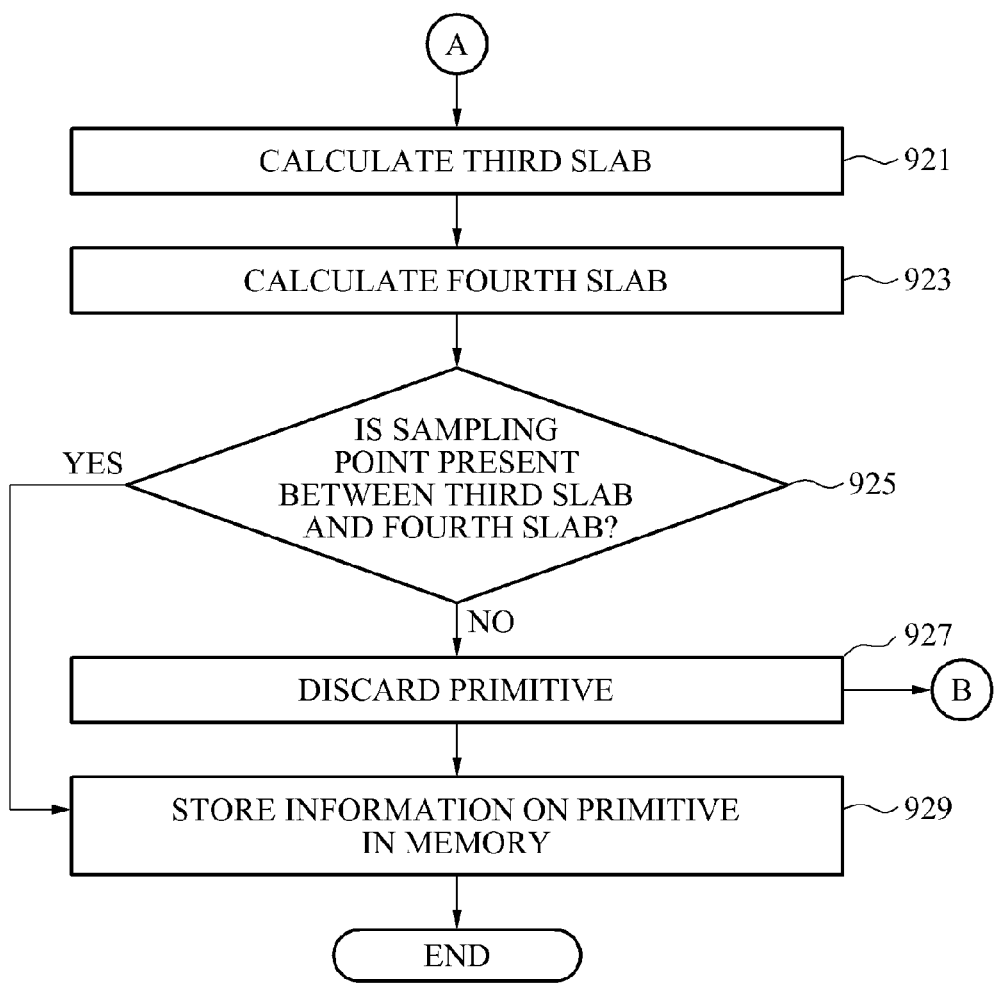

FIGS. 8 and 9 illustrate methods of processing a primitive based on a bounding slab according to example embodiments.

Referring to FIG. 8, in operation 821, a first slab passing through a maximum value of a first axial direction among vertices of the primitive may be calculated.

In operation 823, a second slab passing through a minimum value of the first axial direction among the vertices of the primitive may be calculated.

In operation 825, whether a sampling point is present between the first slab and the second slab may be determined.

When a sampling point is absent between the first slab and the second slab, the primitive may be discarded in operation 827.

For example, the primitive 220 of FIGS. 2 and 10 may be discarded in operation 827. In addition, the primitives 210, 230, 240, and 250 of FIG. 2 or 10 may not be discarded in operation 827.

When a sampling point is present between the first slab and the second slab, a bounding slab of a second axial direction may be calculated in operation 829.

Referring to FIG. 9, in operation 921, a third slab passing through a maximum value of the second axial direction among the vertices of the primitive may be calculated.

In operation 923, a fourth slab passing through a minimum value of the second axial direction among the vertices of the primitive may be calculated.

In operation 925, whether a sampling point is present between the third slab and the fourth slab may be determined.

When a sampling point is absent between the third slab and the fourth slab, the primitive may be discarded in operation 927.

For example, the primitive 250 of FIG. 2 may be discarded in operation 927.

When a sampling point is present between the third slab and the fourth slab, information on the primitive may be stored in a memory in operation 929.

For example, respective information on the primitives 210, 230, and 240 of FIG. 2 may be stored in the memory in operation 929.

In this instance, the information on the primitive may include at least one of vertex information and a color value.

Methods of embodiments may be recorded in non-transitory computer-readable media including program instructions (computer readable instructions) to implement various operations embodied by a computing device such as a computer. The computing device may have one or more processors. The program instructions recorded on the media may be those specially designed and constructed for the purposes of the example embodiments, or they may be of the kind well-known and available to those having skill in the art. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by a computing device using an interpreter. The computer-readable media may also be a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA). The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method of processing a primitive in a three-dimensional (3D) graphics rendering system, the method comprising:
   disposing a primitive in a pixel area;
   processing the primitive using a first process comprising:
      calculating a first slab passing through a maximum value in a first axial direction among vertices of the primitive;
      calculating a second slab passing through a minimum value in the first axial direction among the vertices of the primitive;
      determining whether a sampling point of a pixel in the pixel area overlaps an area between the first slab and the second slab in the pixel area; and
      in response to the sampling point being absent in the area between the first slab and the second slab, discarding the primitive; and
   in response to the sampling point being present in an area between the first slab and the second slab, processing the primitive using a second process comprising:
      calculating a third slab passing through a maximum value in a second axial direction among the vertices of the primitive;
      calculating a fourth slab passing through a minimum value in the second axial direction among the vertices of the primitive;
      determining whether a sampling point of a pixel in the pixel area overlaps an area between the third slab and the fourth slab in the pixel area; and
      in response to the sampling point being absent in the area between the third slab and the fourth slab, discarding the primitive
   wherein each of the first slab and the second slab is a straight line and perpendicular to the first axial direction, and each of the third slab and the fourth slab is a straight line and perpendicular to the second axial direction, and
   wherein the method is performed using at least one processor.

2. The method of claim 1, further comprising:
   storing information on the primitive in a memory, when the sampling point is present in the area between the third slab and the fourth slab.

3. An apparatus for processing a primitive in a three-dimensional (3D) graphics rendering system, the apparatus comprising
   one or more processors configured to:
   dispose a primitive in a pixel area;
   process the primitive using a first process comprising:
      calculating a first slab passing through a maximum value in a first axial direction among vertices of the primitive,
      calculating a second slab passing through a minimum value in the first axial direction among the vertices of the primitive;
      determining whether a sampling point of a pixel in the pixel area overlaps an area between the first slab and the second slab in the pixel area; and
      in response to the sampling point being absent in the area between the first slab and the second slab, discarding the primitive; and
   in response to the sampling point being present in the area between the first slab and the second slab, process the primitive using a second process comprising:
   calculating a third slab passing through a maximum value of the second axial direction among the vertices of the primitive;
      calculating a fourth slab passing through a minimum value of the second axial direction among the vertices of the primitive;
      determine whether a sampling point of a pixel in the pixel area overlaps an area between the third slab and the fourth slab in the pixel area; and
      discard the primitive, when the sampling point is absent in the area between the third slab and the fourth slab,
   wherein each of the first slab and the second slab is a straight line and perpendicular to the first axial direction, and each of the third slab and the fourth slab is a straight line and perpendicular to the second axial direction.

4. The apparatus of claim 3, wherein the one or more processors are further configured to store information on the primitive in a memory, in response to the sampling point being present between the third slab and fourth slab.

5. A method of processing a primitive in a three-dimensional (3D) graphics rendering system, the method comprising:
   disposing, using at least one microprocessor, a primitive in a pixel area;
   processing, using the at least one microprocessor, the primitive in a first direction using a first process comprising:
      determining whether any sampling points of pixels in the pixel area are located in a first area of the pixel area from a first slab that passes through a maximum vertex value of the primitive in the first direction to a second slab that passes through a minimum vertex value of the primitive in the first direction; and when no sampling points are located in the first area, discarding the primitive; and when at least one sampling point is located in the first area, processing, using the at least one microprocessor, the primitive in a second direction, which is different than the first direction, using a second process comprising:

determining whether any sampling points of pixels in the pixel area are located in a second area of the pixel area from a third slab that passes through a maximum vertex value of the primitive in the second direction to a fourth slab that passes through a minimum vertex value of the primitive in the second direction; and when no sampling points are located in the second area, discarding the primitive.

6. The method of claim 5, wherein the first direction is perpendicular to the second direction.

\* \* \* \* \*